United States Patent [19]

Mainiero et al.

[11] Patent Number: 5,074,529
[45] Date of Patent: Dec. 24, 1991

[54] CLIP FOR FORMING A CONCERTINA CONFIGURATION OF HELICAL BARBED TAPE

[75] Inventors: John W. Mainiero; Michael R. Mainiero, both of Sandy Hook, Conn.; Thomas J. Heinlein, Ronkonkoma, N.Y.

[73] Assignee: MRM Security Systems, Inc., Conn.

[21] Appl. No.: 579,388

[22] Filed: Sep. 7, 1990

[51] Int. Cl.$^5$ ............................................. B21F 25/00
[52] U.S. Cl. ............................................ 256/8; 256/2; 256/1; 24/20 R
[58] Field of Search ............................. 256/1, 2, 6–8, 256/47, 54, DIG. 3; 24/20 R, 182, 703.1

[56] References Cited

U.S. PATENT DOCUMENTS

| | | | |
|---|---|---|---|
| 536,488 | 3/1895 | Suter | 256/54 X |
| 547,335 | 10/1895 | Crocker | 24/703.1 X |
| 659,634 | 10/1900 | Allen | 24/703.1 X |
| 782,670 | 2/1905 | Leahy | 24/703.1 X |
| 1,242,620 | 10/1917 | Washburne | 24/703.1 X |
| 2,908,484 | 10/1959 | Uhl | 256/8 |
| 3,463,455 | 8/1969 | Meckel | 256/8 |
| 4,503,423 | 3/1985 | Mainiero et al. | 256/8 X |
| 4,666,129 | 5/1987 | Dobson | 256/8 X |

FOREIGN PATENT DOCUMENTS

| | | | |
|---|---|---|---|
| 3632752 | 3/1988 | Fed. Rep. of Germany | 256/47 |
| 862100 | 2/1941 | France | 256/6 |

Primary Examiner—Andrew V. Kundrat
Attorney, Agent, or Firm—Anthony J. Casella; Gerald E. Hespos

[57] ABSTRACT

A clip is disclosed for connecting two adjacent loops of segment bent helical barbed tape in close proximity to one another at a nesting point of two contiguous folds to form a concertina antipersonnel barrier. The clip includes first and second opposed flaps. The first flap includes an elongated semi-circular aperture extended therethrough and dimensioned to surround the contiguous folds in their entirety such that the clip reinforces the areas of stress concentration that lie proximate the contiguous folds. The second flap includes an identical elongated semi-circular aperture extended therethrough which functions to promote stacking of adjacent coils of helical barbed tape during storage. The clip further includes a unitarily formed locking mechanism defined by an extruded cylindrical sleeve disposed on the first opposed flap and a circular aperture extended through the second opposed flap. In operation the extruded cylindrical sleeve is extended through the circular aperture and compressed so as to expand outwardly and form an eyelet connection, thereby securing two adjacent loops of helical barbed tape.

11 Claims, 2 Drawing Sheets

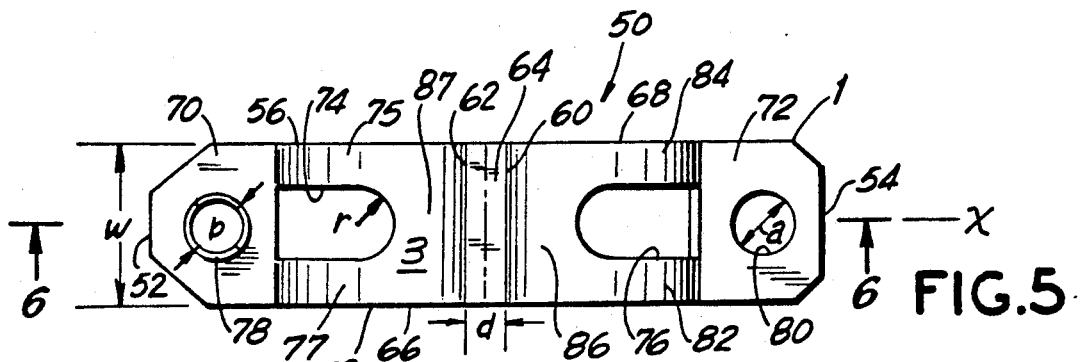
FIG.5
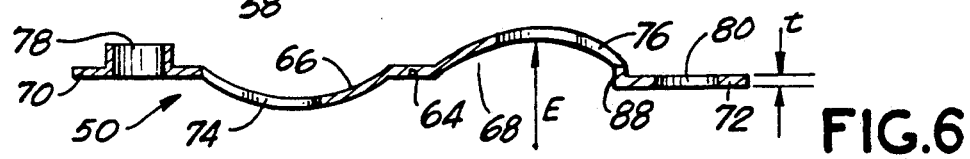
FIG.6
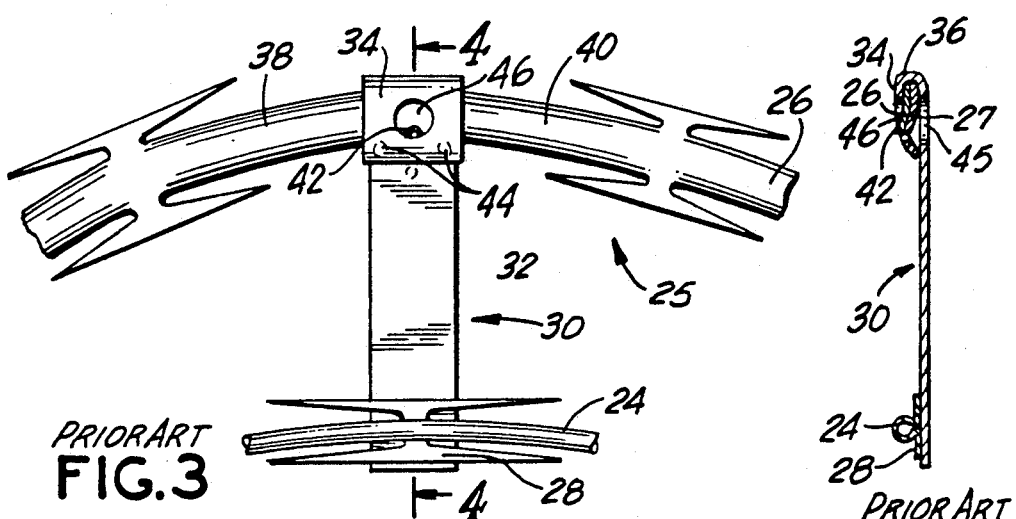
PRIOR ART
FIG.3
PRIOR ART
FIG.4
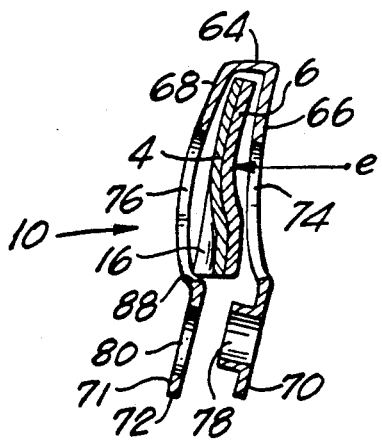
FIG.8
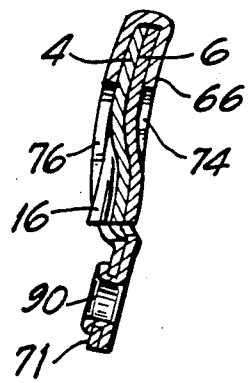
FIG.9

CLIP FOR FORMING A CONCERTINA CONFIGURATION OF HELICAL BARBED TAPE

BACKGROUND OF THE INVENTION

The invention relates to a clip used to create a concertina shaped barrier by connecting adjacent loops of a coil of helical barbed tape.

Helical barbed tape is widely employed as an elongated antipersonnel barrier that may be staked to the ground to define a perimeter, installed at the base of a fence, or mounted on the top of a fence, a wall or a rooftop. The typical helical barbed tape comprises an elongated helically formed central support from which spaced apart clusters of barbs extend. Each cluster of barbs typically comprises a total of four barbs, with a first pair of barbs extending from a root on the radially inner side of the central support and a second pair of barbs extending from a second root on the radially outer side of the central support. Each barb is an elongated generally flat member having opposed converging edges which intersect at a very sharp point. Helical barbed tape is shown in U.S. Pat. No. 3,463,455 which issued to Meckel on Aug. 26, 1969 and is entitled "HELICAL BARBED TAPE UNITS."

One variation of a helical barbed tape product of a general type is manufactured by first roll forming a longitudinally extending barbed tape around a reinforcing wire, and then roll forming the combined tape and reinforcing wire into a helical configuration. A barbed tape product of this type is shown in U.S. Pat. No. 2,908,484 which issued to Uhl on Oct. 13, 1959 and is entitled "BARBED WIRE SPIRAL." In U.S. Pat. No. 2,908,484 the adjoining coils of barbed tape are clipped together at spaced apart intervals to define a barbed tape concertina.

Several improvements have been made in the apparatus and process for manufacturing helical barbed tape products. For example, U.S. Reissue Pat. No. Re. 30,814, which reissued to Michael R. Mainiero on Dec. 8, 1981 entitled "APPARATUS AND METHOD FOR FORMING BARBED TAPE" discloses a machine and a method for making a coil of barbed tape from substantially linear metal stock. The in-line method for forming barbed tape, as disclosed in U.S. Reissue Pat. No. Re. 30,814, simplified manufacture of a coil of metal tape in an in-line mass production operation, with the resulting product being closely compacted helical coil which is suited for extended field use as an antipersonnel barrier. The helical barbed tape that is depicted in U.S. Reissue Pat. No. Re. 30,814 is formed from an elongated strip of metal stock which is stamped and then edge bent into identical segments of equal length which are offset at an exact bend angle relative to a trailing edge segment, thereby forming the tape into an annular coil having a continuous succession of identical adjoining segments. The edge bending process creates periodic folds in the central supporting portion of the coil at a juncture between identical straight line segments of the barbed tape. The folds result in an abrupt change in the cross section of the barbed tape, thereby causing stress concentrations located on the radially outer edge of the fold and in areas along both sides of the fold. The area located on the radially outer edge of the fold is affected by tensile stress caused by the stretching of the radially outer portion of the tape during the edge bending process, whereas the areas along either side of the fold are affected by compressive stress caused by the buckling of the radially inner portion of the tape during the edge bending process.

The concentrations of stress that arise proximate to the fold may promote the formation of microscopic cracks and fissures in the material. The propagation of such a crack or fissure, which can be caused by constant exposure to high winds, windswept sand, heavy rains, or below freezing temperatures, would most likely result in a failure of the material over extended periods of time, thereby compromising the security of the facility that the barrier is intended to protect. A further stress related failure can occur if the helical barbed tape is improperly installed on the top of a fence or wall. In particular, the tape may be forcibly manipulated into an undesirable configuration, thereby introducing additional stress to the material in the regions of the folds.

U.S. Pat. No. 4,503,423 which issued to Joseph J. Mainiero et al., on Mar. 5, 1985 entitled "EXTENSIBLE AND RETRACTABLE BARRIER AND ELECTROMAGNETIC INTRUSION DETECTOR THEREFOR," discloses a single coil structure wherein adjacent loops of helical barbed tape coil are welded to one another at a plurality of spaced apart locations about each loop to achieve a desired concertina configuration. In U.S. Pat. No. 4,503,423 the weldments between the adjacent loops on the barbed tape permanently secures opposed major surfaces of adjacent turns of the coil in abutting face-to-face surface contact. The resulting connection prevents longitudinal, radial, and pivotal motion of adjacent turns relative to one another at the attachment points. The rigid and permanent weldment of adjacent coils at a plurality of such attachment points defines a concertina-like structure which is intended to prevent intruders from passing between adjacent coils.

In a common thirty three loop, thirty inch concertina configuration of helical barbed tape, such as that described in U.S. Pat. No. 4,503,423, there are approximately one hundred welded connections, each loop having three designated attachment points. It is essential to weld each of the adjacent loops of the helical barbed tape in a specific pattern or the concertina configuration will be compromised. Therefore, if adjacent coils of helical barbed tape are inadvertently welded at a location other than the required attachment point, the entire barrier will have to be discarded because the welded connection is permanent. Furthermore, the heat associated with the welding of adjacent loops of coil may cause a local weakness or damage to the helical barbed tape.

U.S. Pat. No. 4,906,975 which issued to Casella et al., on Mar. 6, 1990 entitled "VIBRATION RESPONSIVE INTRUSION DETECTION BARRIER," discloses an intrusion detection barrier comprising inner and outer coils defined by helical barbed tape. The inner coil includes a vibration sensitive electrical cable and is supported centrally within the outer coil by radially extending supports or straps. In particular, U.S. Pat. No. 4,906,975 discloses a radially extending support strap comprising an elongated strip of metal, having been bent into a generally J-shaped structure about an axis orthogonal to its longitudinal axis, to define an elongated support section, a small arched region, and an engaging flap. The radially outer end of the elongated support section and the engaging flap both include identical circular apertures extended therethrough and symmetrically opposed. The radially outer portion of the elongated support section, the arched region and the engaging flap are deployed about two contiguous outer coil loops of concentric helical barbed tape at the folded juncture between two edge bent segments. The circular aperture disposed in the engaging flap is intended to make contact with the fold on the segment bent helical barbed tape, thereby minimizing pivotal motion at the connection point. The circular aperture disposed in the radially outer end of the elongated support section of the strap is intended to promote the proper nesting of adjacent coil loops during storage. To secure the two contiguous outer loops of concentric helical barbed tape together, the radially inner distal end of the engaging flap is spot welded intermediate the elongated support section, thereby permanently connecting the adjacent loops of helical barbed tape at a plurality of juncture points between two identical edge bent segments about the circumference of the coil to form the desired concertina configuration. Despite the desirable features found in U.S. Pat. No. 4,906,975 it is desired to provide significant advances in clip means for connecting adjacent coils of helical barbed tape to form a desired concertina configuration.

Accordingly, it is an object of the subject invention to provide a new and improved clip for connecting two adjacent coils of segment-bent helical barbed tape in a concertina configuration in a manner to reinforce the stressed regions along the radially outer edges of the contiguous folds as well as along either side of the contiguous folds.

It is an additional object of the subject invention to provide a clip with a unitary mechanical locking system which can be removed from adjacent loops of helical barbed tape in the event that the clip was inadvertently connected at an undesirable location.

It is a further object of the invention to provide an unformed clip blank that includes stamped reinforcing apertures and a unitary locking system, which can be loaded into a magazine on an automatic installation gun and quickly installed on adjacent loops of segment bent helical barbed tape to form a concertina configuration.

SUMMARY OF THE INVENTION

The subject invention is directed to a new and improved clip for connecting adjacent coils of helical barbed tape in close proximity to one another to create a concertina shaped antipersonnel barrier. The clip of the subject invention includes elongated semi-circular apertures of specific design for structural reinforcement of the folds on segment bent helical barbed tape, and a unitary mechanical locking system.

The unformed clip blank of the subject invention comprises an elongated strip of metal which is intended to be bent into a U-shape along an axis orthogonal to the longitudinal axis of the clip to define opposed flaps. Each of the opposed flaps includes an elongated semi-circular apertures extended therethrough, having a curved section with a radius "r" and an elongated section having an approximate length of four times "r". The apertures are oriented in a mirror imaged fashion such that their semi-circular edges face one another and are disposed equidistant from the central axis disposed orthogonal to the longitudinal axis of the elongated clip blank. The apertures are dimensioned so as to fully encompass and closely engage the periphery of the fold at the juncture between two edge bent segments of helical barbed tape. In particular, the regions of the clip along the lateral edges of the elongated semi-circular apertures, and the regions between the axis orthogonal to the longitudinal axis and the curved portion of each of the elongated semi-circular apertures function to reinforce the regions of stress concentrations that arise in the area located on the radially outer edge of the fold and in the areas along both sides of the fold in the segment-bent helical barbed tape.

The unformed clip blank of the subject invention further includes a locking mechanism formed unitary with the clip and defined by a circular aperture disposed in the distal end of one of the opposed flaps of the clip, and an extruded cylindrical sleeve disposed on the distal end of the other opposed flap of the clip. In order to install the clip, it is bent into a U-shape about two adjacent loops of segment-bent helical barbed tape and secured by compressing the opposed flaps together such that the extruded cylindrical sleeve extends through the circular aperture, after which the sleeve is compressed so as to expand radially outward, and make contact with the exposed surface of the other opposed flap, thereby forming an eyelet type connection. The resulting connection is substantially rigid and secure but is not permanently attached to the coils per se. Therefore, the clip can be severed and removed should the situation arise in which it was improperly deployed.

Furthermore, the resulting connection significantly strengthens the barbed tape, thereby inhibiting the propagation of minute cracks that may arise as a consequence of stress concentrations. Thus the likelihood of the occurrence of a failure of the helical barbed tape is greatly reduced and the life expectancy of the helical barbed tape barrier is significantly extended.

BRIEF DESCRIPTION OF THE DRAWINGS

FIG. 3 is a top plan view of a section of concentric helical barbed tape showing a prior art J-shaped strap engaged at the edge bent fold.

FIG. 4 is a cross-sectional view taken along line 4—4 of FIG. 3 and showing the prior art strap engagement with the two contiguous helical barbed tapes.

FIG. 5 is a top plan view of the blank for forming the clip of the subject invention.

FIG. 6 is a cross-sectional view taken along line 6—6 of FIG. 5.

FIG. 8 is a cross-sectional view taken along line 8—8 of FIG. 7 but showing the clip prior to engagement with the two contiguous helical barbed tapes.

FIG. 9 is a cross-sectional view similar to FIG. 8 but showing the clip fully engaged with the two contiguous helical barbed tapes, as in FIG. 7.

DETAILED DESCRIPTION OF THE PREFERRED EMBODIMENT

Figure 1:
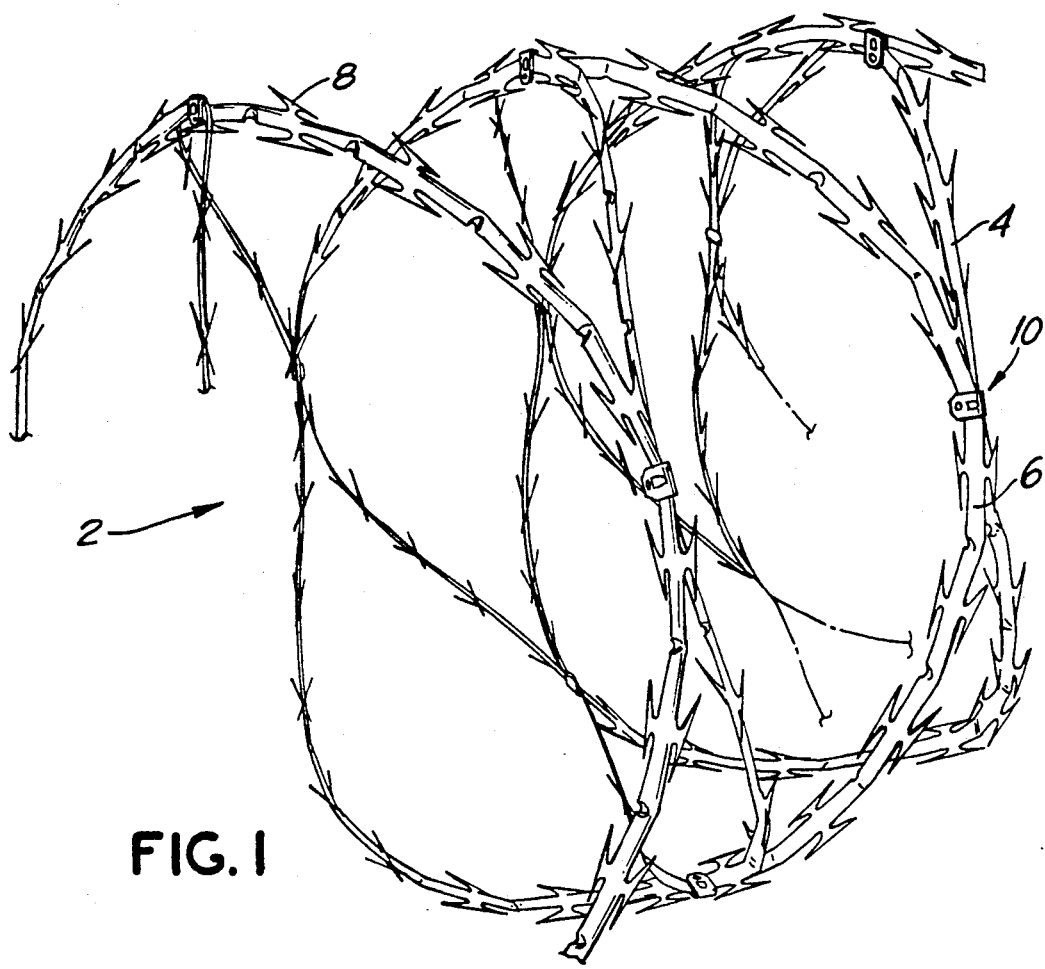
FIG. 1 is a perspective view of a concertina barbed tape barrier employing the clips of the subject invention.

The concertina coil clip of the subject invention is illustrated in FIG. 1 and is designated generally by reference numeral 10. As shown in FIGS. 5 and 6, the blank for forming the clip 10 comprises an elongated strip of metal 1 having a major surface 3 with a face width dimension "W" substantially greater than its thickness "t". The clip 10 is intended to be bent into a generally U-shaped configuration about adjacent loops 4 and 6 of the helical barbed tape 2 and employed at a plurality of locations about the perimeter of each loop to form a concertina-like structure.

Figure 2:
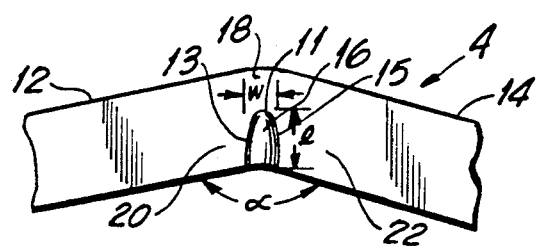
FIG. 2 is a top plan view of a section of segment bent helical barbed tape illustrating the edge bent fold.

Turning to FIG. 2, the helical barbed tape 2 is fabricated from a linear strip of metal stock which has been stamped to form barbs 8, roll formed to achieve a desired crown with a radius of curvature "e", and then edge bent into identical segments 12 and 14 of equal length which are offset at an exact bend angle "α" relative to one another. The edge bending process creates a uniform fold 16 which is formed at a juncture between the linear tape segments 12 and 14. The fold 16 includes lateral edges 13 and 15 having a maximum radial length "l", and a maximum width "w". The fold 16 is intended to promote stacking of adjacent turns of the helical barbed tape 2 into a uniform coil. The manufacturing process which forms the fold 16 can further result in the creation of stress concentrations located in a region 18 along the radially outer edge 11 of the fold 16 on the helical barbed tape 2, and in regions 20 and 22 along the lateral edges 13 and 15 of the fold 16 on the helical barbed tape 2. The region 18 along the radially outer edge 11 of the fold 16 is affected by tensile stress, whereas the regions 20 and 22 along the lateral edges 13 and 15 of the fold 16 are affected by compressive stress, both stresses resulting from the edge bending manufacturing process. The concentrations of stress along the radially outer edge 11 of the fold 16 and along the lateral edges 13 and 15 of the fold 16 can promote the formation of microscopic cracks or fissures in the helical barbed tape 2. The cracks or fissures could propagate through the helical barbed tape 2 when it is subjected to continuous exposure to wind, rain and freezing temperatures over extended periods of time, thereby resulting in a possible failure of the helical barbed tape 2 at the fold 16 between two consecutive linear edge bent segments 12 and 14.

A prior art radially extending support strap which interconnects the inner and outer coils of concentric helical barbed tape, and connects two contiguous outer coils of concentric helical barbed tape is illustrated in FIGS. 3 and 4 and is identified generally by the numeral 30. The radially extending support strap 30 supports the inner coil 24 within the outer coil 26 of the concentric helical barbed tape 25. The radially extending support strap 30 comprises an elongated strip of metal bent into a generally J-shaped structure about an axis orthogonal to its longitudinal axis to define an elongated support section 32, an arched region 36, and a radially inward extending engaging flap 34. The radially outer portion of the elongated support section 32 includes a circular aperture 45 extended therethrough, and intended to enable a nesting of adjacent loops of the outer coil 26 of the concentric helical barbed tape 25 during storage. The inwardly extending engaging flap 34 includes a circular aperture 46, extended therethrough and dimensioned to make holding contact with the fold 42 at the juncture between the two linear edge bent segments 38 and 40 of the outer loop 26 on the concentric helical barbed tape 25.

In FIG. 4 the prior art strap 30 is fully engaged on the concentric coils 24 and 26 of the barbed tape 25. The radially outer portion of the elongated support section 32, the arched region 36, and the engaging flap 34 are deployed about the two contiguous outer loops 26 and 27 of the concentric helical barbed tape 25. The circular aperture 46 on the engaging flap 34 is generally in contact with the fold 42 in the outer loop 26 of the concentric helical barbed tape 25. The distal end of the inwardly extending engaging flap 34 is connected intermediate the elongated support section 32 by weldments 44, thereby permanently holding adjacent outer loops 26 and 27 of the concentric helical barbed tape 25 in close proximity to one another to define a concertina structure. Furthermore, the radially inner distal end of the elongated support section 32 of the strap 30 is welded to the barb cluster 28 on the inner coil 24 of the concentric helical barbed tape 25, thereby permanently interconnecting the inner coil 24 with the outer coil 26 of the concentric helical barbed tape 25.

The details of construction of the blank for forming the concertina coil clip of the subject invention are illustrated in FIGS. 5 and 6. The clip blank 50 comprises an elongated strip of metal 1 having lateral edges 56 and 58 and distal edges 54 and 54. The elongated clip blank 50 includes two score liens 60 and 62 disposed orthogonal to the longitudinal axis "x" of the clip blank 50 and disposed equidistant from either of the distal edges 52 and 564, and separated by a distance "d" to define an arch region 64. The width "d" of the arch region 64 is approximately equal to the thickness of the two contiguous nested coils 4 and 6 of helical barbed tape 2. The clip blank 50 further includes two coil engaging zones 66 and 68 symmetrically opposed on either side of the arch region 64. The coil engaging zones 66 and 68 include mirror imaged elongated semi-circular apertures 74 and 76, extended therethrough and dimensioned such that the semi-circular sections have a radius "r" that is approximately equal to half of the maximum width "w" of the fold 16 on the helical barbed tape 2, and the elongated sections each have a length of four times "r" that is approximately equal to the maximum radial length "l" of the fold 16 on the helical barbed tape 2. The coil engaging zones 66 and 68 possess opposite crowns with a radius of curvature "E" that is approximately equal to the radius of curvature "e" of the crown of the helical barbed tape 2.

The coil engaging zones 66 and 68 further include stress reinforcing regions. A major reinforcing face 86 is disposed between the arch region 64 and the elongated semi-circular aperture 76 on the coil engaging zone 68, and a major reinforcing face 87 is symmetrically disposed between the arch region 64 and the elongated semi-circular aperture 76 on the coil engaging zone 66. The coil engaging zones 66 and 68 further include lateral reinforcing legs. Lateral reinforcing legs 82 and 84 are disposed on the sides of the elongated semi-circular aperture 76 and are defined by its lateral edges and the lateral edges 56 and 58 of the clip blank 50. Lateral reinforcing legs 75 and 77 are disposed on the sides of the elongated semi-circular aperture 74 and are defined by its lateral edges and the lateral edges 56 and 58 of the clip blank 50.

The clip blank 50 further comprises a tab 72 on the distal end of the coil engaging zone 68 and a tab 70 on the distal end of the coil engaging zone 66. The tab 72 includes a circular aperture 80 disposed therein, having a diameter "a". The tab 70 includes an extruded cylindrical sleeve 78 disposed thereon, having an outer diameter "b", which is slightly less than the diameter "a" of the circular aperture 80. The tab 72 further includes a step riser 88 disposed on the border between the coil engaging zone 68 and the tab 72.

Figure 7:
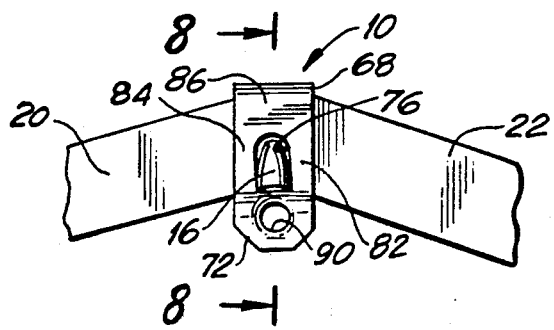
FIG. 7 is a top plan view of a section of helical barbed tape showing the clip of the subject invention engaged at the edge bent fold of two contiguous coils.

The engagement of the concertina coil clip 10 of the subject invention and the segment bent helical barbed tape 2 is illustrated in FIGS. 7 through 9. The clip 10 is bent into a U-shape about the score lines 60 and 62 to engage the adjacent coils 4 and 6 of the helical barbed tape 2 at the fold 16 between two consecutive linear edge bent segments 12 and 14. In FIG. 7, the fold 16 is fully engaged by the elongated semi-circular aperture 76, such that the lateral edges 13 and 15 and the radially outer edge 11 of the fold 16 are closely abutted by the edges of the aperture 76, thereby inhibiting relative pivotal movement of the coils at the attachment point. The major reinforcing face 86 functions to reinforce the region of tensile stress concentration 18 along the radially outer edge 11 of the fold 16 on the segment bent helical barbed tape 2. The lateral reinforcing legs 82 and 84 function to reinforce the regions of compressive stress 20 and 22 along the lateral edges 13 and 15 of the fold 16 on the helical barbed tape 2.

Turning to FIG. 8 the clip 10 is partially engaged about the adjacent loops 4 and 6 of the helical barbed tape 2. The step riser 88 functions to improve the intimacy of contact between the tabs 70 and 72. In FIG. 9 the opposed tabs 70 and 72 are compressed together such that the extruded cylindrical sleeve 78 extends through the circular aperture 80. Thereafter, the extruded cylindrical sleeve 78 is compressed to expand radially outward and make contact with the exposed surface 71 of the tab 72, whereby an eyelet connection 90 is formed. The engagement operation functions to simultaneously connect the adjacent loops 4 and 6 of the helical barbed tape 2 in close proximity to one another to achieve a desired connection for the concertina configuration. The resulting eyelet connection 90 can be severed and the clip 10 can be removed should the situation arise in which the clip 10 was incorrectly deployed in a position other than one of the required connection points that are necessary to construct the desired concertina configuration.

In FIG. 9 the elongated semi-circular aperture 74 on the coil engaging zone 66 is positioned so as to engage the edge bent fold of another adjacent loop of helical barbed tape 2 when it is collapsed into its nested storage position. The crown on the upper coil 4 of the two contiguous coils 4 and 6 of the helical barbed tape 2, having a radius "e", is in intimate contact with the coil engaging zone 68, having a similar radius of curvature "E". The arch region 64, having a width "d", is in intimate contact with the radially outer edges of the two contiguous loops 4 and 6 of the helical barbed tape 2, having a combined thickness approximately equal to the distance "d". The crown on the lower coil 6 of the two contiguous coil loops 4 and 6 of the helical barbed tape 2, having a radius of curvature "e" is in intimate contact with the coil engaging zone 66, having a similar radius of curvature "E". The cumulative effect of the intimate contact between the two contiguous coils 4 and 6 of the helical barbed tape and the surfaces of the clip 10 is a closely nested face-to-face fit that inhibits relative motion between the two loops 4 and 6, thereby ensuring the structural integrity of a concertina barrier of helical barbed tape 2.

In summary, a new and improved clip is provided comprising an elongated strip of metal bent into a U-shape to define opposed flaps. Each of the flaps has an elongated, semi-circular aperture dimensioned to engage the edge bent fold on helical barbed tape and primarily reinforce the areas of stress concentration proximate to the edge bent fold on helical barbed tape. The clip is unitarily formed with a locking mechanism comprising a circular aperture on one opposed flap and an extruded cylindrical sleeve on the other. The clip is deployed around adjacent loops of helical barbed tape by compressing the opposed flaps of the clip, so that the extruded cylindrical crimp extends through the circular aperture and is subsequently compressed to expand radially outward and form an eyelet, thereby securely fastening the opposed flaps of the clip.

While the invention has been described with respect to a preferred embodiment, it is apparent that various changes can be made without departing from the scope of the invention.

We claim:

1. A clip to connect two adjacent loops of segment-bent helical barbed tape at a nesting point of two contiguous folds to form a concertina shaped structure, said helical barbed tape having a crowned cross-sectional configuration, said clip comprising an elongated strip of metal having a central axis orthogonal to the longitudinal axis thereof, said clip being U-shaped to define first and second opposed flaps, said clip including a unitarily formed locking system defined by said first flap including a circular aperture disposed adjacent the distal end thereof, and an extruded cylindrical sleeve disposed adjacent the distal end of said second flap, said cylindrical sleeve being extended through said circular aperture and thereafter compressed to expand radially outward and form an eyelet-type connection on aid first opposed flap, said first and second opposed flaps each having an elongated semi-circular aperture dimensioned to completely abut the edges of said contiguous fold respectively disposed intermediate said first and second opposed flaps, whereby the elongated semi-circular apertures and the contiguous folds in the adjacent loops of helical barbed tape are interlocked so as to reinforce the regions of stress concentration that arise proximate the contiguous folds.

2. A clip as in claim 1 wherein said elongated semi-circular apertures are defined by a semi-circular portion having a radius "r" and an elongated portion having a length equal to a multiple of "r".

3. A clip as in claim 2 wherein said elongated semi-circular apertures are generally symmetrically disposed on areas of said first and second opposed flaps equally spaced from the central axis of said clip.

4. A clip as in claim 1, wherein aid first and second opposed flaps are curved and have a radius of curvature equal to the radius of curvature of the crown of the helical barbed tape so as to achieve intimate contract with the crown of said helical barbed tape.

5. A clip as in claim 1, wherein said first opposed flap includes a step riser disposed between said elongated semi-circular aperture and said circular aperture to achieve intimate contact between the curved opposed flaps and the crown of the helical barbed tape.

6. A clip as in claim 1 wherein said strip of metal includes a first and a second score line respectively symmetrically disposed on said first and second flaps equally spaced from the central axis of said clip to define the base of said U-shaped clip therebetween having a width equal to the thickness of two contiguous coils of helical barbed tape.

7. A clip as in claim 1 wherein said elongated semi-circular apertures are respectively disposed in areas of said first and second opposed flaps equally spaced from the central axis of said clip and defined by a semi-circular portion having a radius "r" and an elongated portion having a length equal to a multiple of "r".

8. A clip to connect two adjacent loops of segment-bent helical barbed tape at a nesting point of two contiguous folds to form a concertina shaped structure, said helical barbed tape having a crowned cross-sectional configuration, said clip comprising an elongated strip of metal having a central axis orthogonal to the longitudinal axis thereof, said clip being U-shaped to define first and second opposed flaps, said strip of metal including a first and a second score line respectively symmetrically disposed on said first and second flaps equally spaced from the central axis of said clip to define the base of said U-shaped clip therebetween having a width equal to the thickness of two contiguous coils of said helical barbed tape, said first and second opposed flaps being curved and having a radius of curvature that is equal to the radius of curvature of the crown of the helical barbed tape to achieve intimate contact with the crown of said helical barbed tape, said clip including a unitarily formed locking system defined by said first flap including a circular aperture disposed adjacent the distal end thereof, and an extruded cylindrical sleeve disposed adjacent the distal end of said second flap, said extruded cylindrical sleeve is extended through said circular aperture and thereafter compressed so as to expand radially outward to form an eyelet connection on said first flap, said first and second opposed flaps each having an elongated semi-circular aperture dimensioned to completely abut the edges of said contiguous folds respectively disposed intermediate said first and second opposed flaps, whereby the elongated semi-circular apertures and the contiguous folds in the helical barbed tape are interlocked so as to reinforce the regions of stress concentration that arise proximate the contiguous folds.

9. A clip as in claim 8 wherein said elongated semi-circular apertures are respectively disposed in areas of said first and second opposed flaps equally spaced from the central axis of said clip and defined by a semi-circular portion having a radius "r" and an elongated portion having a length equal to a multiple of "r".

10. A clip as in claim 8, wherein said first opposed flap includes a step riser disposed between said elongated semi-circular aperture and said circular aperture to achieve intimate contact between the curved opposed flaps and the crown of the helical barbed tape.

11. A clip to connect two adjacent loops of segment-bent helical barbed tape at a nesting point of two contiguous folds to form a concertina shaped structure, said helical barbed tape having a crowned cross-sectional configuration, said clip comprising an elongated strip of metal having a central axis orthogonal to the longitudinal axis thereof, said clip being U-shaped to define first and second opposed flaps, said strip of metal including a first and a second score line respectively symmetrically disposed on said first and second flaps equally spaced from the central axis of said clip to define the base of said U-shaped clip therebetween having a width equal to the thickness of two contiguous coils of helical barbed tape, said first and second opposed flaps being curved and having a radius of curvature that is equal to the radius of curvature of the crown of the helical barbed tape so as to achieve intimate contact with the crown of said helical barbed tape, said clip including a unitarily formed locking system defined by said first flap including a circular aperture disposed adjacent the distal end thereof and an extruded cylindrical sleeve disposed adjacent the distal end of said second flap, said extruded cylindrical sleeve is extended through said circular aperture and thereafter compressed so as to expand radially outward to form an eyelet connection on said first flap, said first and second opposed flaps each having an elongated semi-circular aperture dimensioned to completely abut the edges of said contiguous folds respectively disposed intermediate said first and second opposed flaps, said elongated semi-circular apertures being defined by a semi-circular portion having a radius "r" and an elongated portion having length equal to a multiple of "r", said elongated semi-circular apertures being generally symmetrically disposed on areas of said first and second opposed flaps equally spaced from the second axis of said clip, said first opposed flap including a step riser disposed between said elongated semi-circular aperture and said circular aperture to ensure intimate contact between said curved first flap and said curved second flap and the crown of the helical barbed tape during a locking engagement, whereby the elongated semi-circular apertures and the contiguous folds in the helical barbed tape are interlocked so as to reinforce the regions of stress concentration that arise proximate the contiguous fold.

* * * * *